United States Patent [19]
Niimura

[11] 3,980,816
[45] Sept. 14, 1976

[54] A.G.C. CIRCUIT FOR A VIDEO SIGNAL

[75] Inventor: Tsutomu Niimura, Tokyo, Japan

[73] Assignee: Sony Corporation, Tokyo, Japan

[22] Filed: July 1, 1975

[21] Appl. No.: 592,178

[30] Foreign Application Priority Data
July 8, 1974  Japan.................................. 49-77968

[52] U.S. Cl............................................. 178/7.3 R
[51] Int. Cl.².......................................... H04N 5/52
[58] Field of Search......... 178/7.3 R, 7.3 DC, 7.3 S, 178/7.5 R, 7.5 DC, 7.5 S

[56] References Cited
UNITED STATES PATENTS

| | | | |
|---|---|---|---|
| 2,885,472 | 5/1959 | Billin et al..................... | 178/7.3 DC |
| 3,524,021 | 8/1970 | Hickok............................ | 178/7.3 S |

*Primary Examiner*—Robert L. Richardson
*Attorney, Agent, or Firm*—Lewis H. Eslinger; Alvin Sinderbrand

[57] ABSTRACT

An automatic gain control circuit for a video signal amplifier to integrate the synchronizing pulse portion of the composite signal and apply the integrated signal to a pulse generating circuit to generate a pulse each time the integrated signal exceeds a certain level. The pulse, which has a fixed magnitude, is added to the amplified video signal in the same polarity relative to the blanking level as the luminance signal. A control circuit measures the peak-to-peak value of the combined signal and generates a controlling signal having a magnitude that varies with changes in the peak value and is used to control the gain of the amplifier.

7 Claims, 9 Drawing Figures

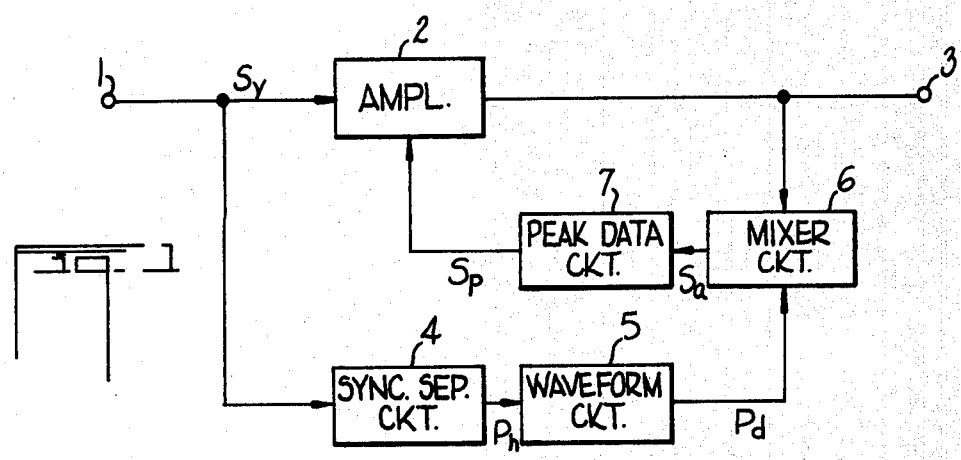
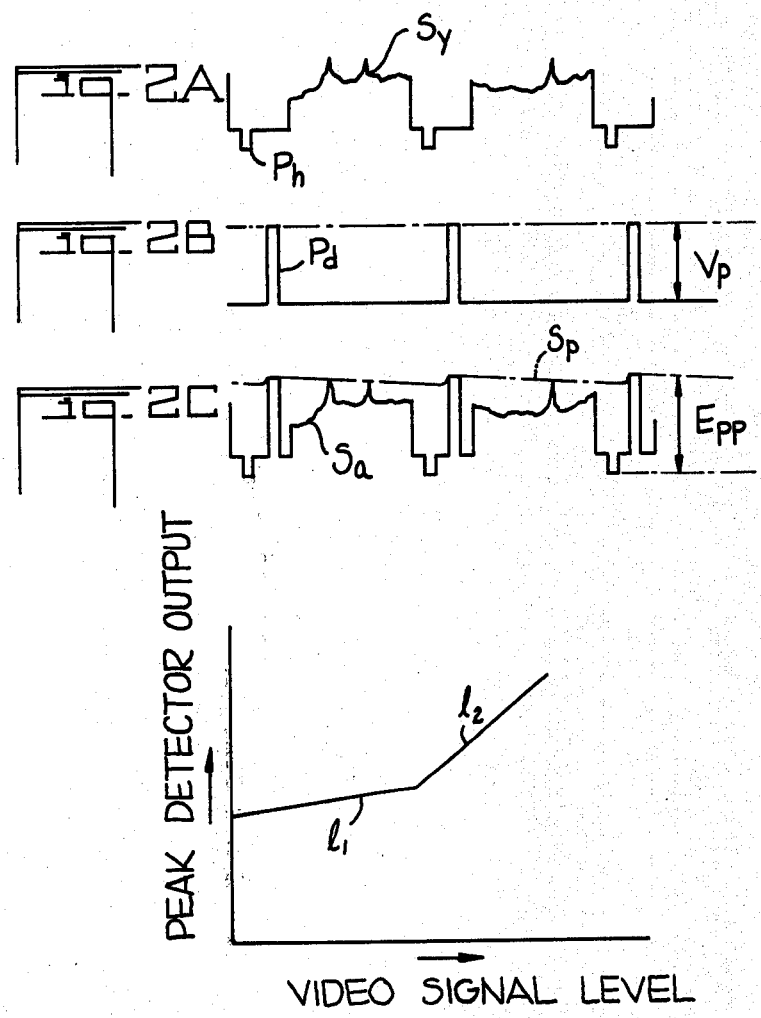

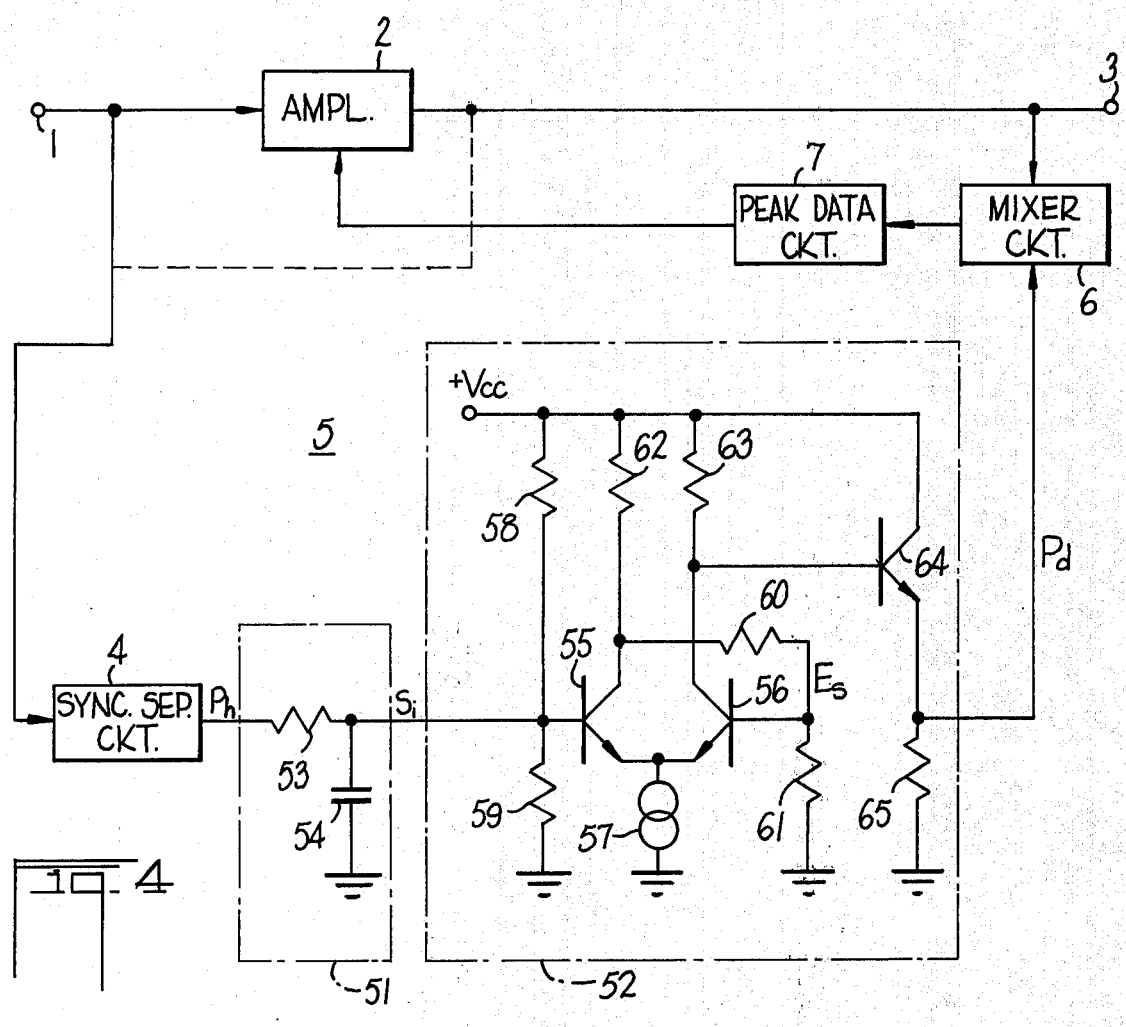
Fig. 4
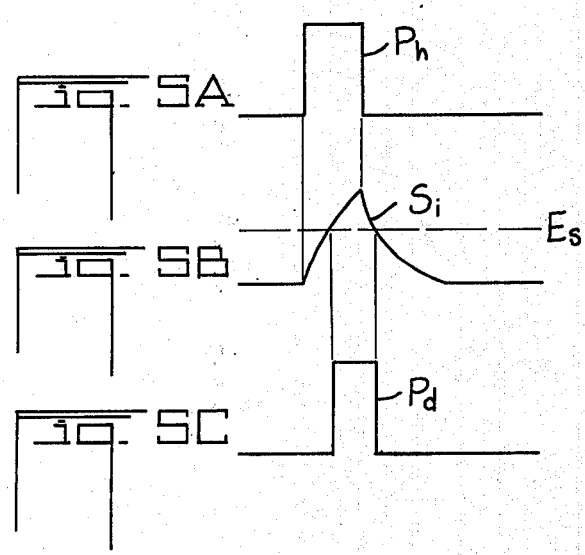
Fig. 5A
Fig. 5B
Fig. 5C

A.G.C. CIRCUIT FOR A VIDEO SIGNAL

BACKGROUND OF THE INVENTION

1. Field of the Invention

This invention relates to an automatic gain-control circuit (which is referred hereinafter to as an A.G.C. circuit) for a video signal and is particularly directed to an A.G.C. circuit in which a pulse signal having a constant magnitude is superposed onto the back porch of the horizontal blanking pulse of a video signal for controlling the amplitude of the video signal by detection of variation in the amplitude of the combined signal.

2. The Prior Art

It is known to control the gain of a video amplifier automatically by producing a pulse signal timed to occur during the back porch interval of the horizontal synchronizing and blanking pulse interval, setting the amplitude of the newly provided pulses to exceed the normal level of the video white luminance signals, and combining the controlled amplitude pulses with the composite video signal in such a polarity that the controlled amplitude pulses extend in the same relative polarity as the luminance video signals, and then measuring the peak-to-peak voltage of the combined signals. As long as the amplitude of the video signal, including the synchronizing signal pulses, remains constant, the amplitude of the video signal is constant. If there is a change in peak-to-peak voltage, the change will be due to a variation in the amplification of the video and synchronizing pulse signal. By detecting the peak-to-peak value, a voltage may be generated that is a linear function of the video signal amplitude and this voltage may be used to control the gain of a video signal amplifier to adjust the overall video signal level to a desired value. The amplitude change will show up only in a change of the synchronizing signal portion as long as the peak white signal remains below the amplitude of the added pulses.

In such a circuit, if the amplitude of the video signal increases sufficiently to cause the peak white signal values to exceed the amplitude of the added pulse signal, the change in peak-to-peak voltage value will be a measure not only of a change in the amplitude of the synchronizing pulse part of the signal, but also of the luminance part of the signal. As a result, the output voltage of the detector of the peak-to-peak value will vary much more sharply with an increase in the video signal level than if the luminance signal does not exceed the amplitude of the pulse signal added to the video signal. This will cause the gain of the gain controlled amplifier to adjust more quickly and thus assist the return of the overall video signal amplitude to its proper value.

One of the problems in such circuits is in the generation of the pulse signal of constant amplitude. If this pulse signal is generated by differentiating the horizontal synchronizing signal and then using the trailing edge to initiate the operation of a pulse clipping signal, additional pulses will be produced by the differentiating circuit, and these pulses may have an adverse effect on the video signal since they are, in effect, noise pulses. Furthermore, the differentiating circuit allows high frequency noise pulse signals to pass easily and to interfere with the operation of the peak-to-peak detector circuit. Noise signals can produce delayed pulses that affect the circuit in the same way, but at the wrong time as the desired delayed pulses.

Another way to generate pulses that occur during the back porch interval is to apply the synchronizing pulses to a delay circuit that includes inductance and capacitance. This type of delay circuit cannot be produced in an integrated circuit and so is difficult to incorporate in apparatus intended to be constructed by the integrated circuit technique. Furthermore, the inductance is likely to vary with temperature so that the delay time and the pulse width of the delay pulse may very well vary in response to changes in the temperature.

SUMMARY OF THE INVENTION

It is an object of this invention to provide an automatic gain control (A.G.C.) circuit that tends to reduce the effect of noise signals rather than to enhance them.

A further object of the invention is to provide an improved A.G.C. circuit that operates in a stable manner and is substantially independent of variations in temperature.

A still further object of this invention is to provide an A.G.C. circuit capable of being constructed as an integrated circuit and without the use of additional inductances and capacitors.

In accordance with this invention horizontal synchronizing signal pulses are separated from the composite video signal and applied to a simple integrating circuit, which is inherently not responsive to high frequency noise signals. The integrated signal is then applied to a pulse generator, such as a Schmitt generator, to produce a delayed pulse that has a leading edge produced when the integrated signal rises above a turn-on value and a trailing edge produced when the integrated signal falls below a turn-off value slightly lower than the turn-on value. The output pulse signal of the Schmitt circuit, when amplified and held at a predetermined peak value, is mixed to the proper polarity with the composite video signal at the output of the gain controlled amplifier, the peak-to-peak value can be detected and applied to control the gain of the amplifier.

BRIEF DESCRIPTION OF THE DRAWINGS

FIG. 1 is a block diagram of a gain control system using existing techniques.

FIGS. 2A thru 2C show a series of waveforms of signals encountered in the operation of the circuit in FIG. 1.

FIG. 3 is a graph of the operating characteristics of the circuit of FIG. 1.

FIG. 4 is a circuit, partly in block form and partly in schematic form, illustrating the present invention as applied to the control of the gain of an amplifier circuit.

FIGS. 5A thru 5C are a series of waveforms encountered in the operation of the circuit in FIG. 4.

DETAILED DESCRIPTION OF THE INVENTION

A well known type of A.G.C. circuit is shown in FIG. 1 in which a video signal $S_y$, which is also shown in FIG. 2A, is applied to an input terminal 1 connected to a gain controlled amplifier 2. The output terminal of the gain controlled amplifier is connected to a system output terminal 3 from which it may be connected to any suitable circuit or device, such as a modulator circuit in a video tape recorder (V.T.R.).

The video signal $S_y$ is also applied to a synchronizing signal separating circuit 4 to separate the horizontal synchronizing signal $P_h$ from the composite video signal $S_y$. The synchronizing signal $P_h$ is then transformed by means of a wave forming circuit 5 into the desired signal $P_d$, shown in FIG. 2B which has a polarity that is opposite from the polarity of the synchronizing signal $P_h$. The signal $P_d$, which is produced in the wave forming circuit 5, has a constant magnitude greater than the average amplitude of the white peaks of the video signal and is delayed by a predetermined amount of time to occur during the back porch interval of each horizontal blanking pulse. The signal $P_d$, in which the pulses have a fixed amplitude $V_p$, is also applied to one terminal of a mixer circuit 6 and the composite video signal $S_y$ obtained from the output of the amplifier 2 is applied to another input terminal of the mixer circuit. As a result, a combined video signal $S_a$, shown in FIG. 2C, is generated in the mixer circuit and is present at the output terminal thereof where it is applied to a peak detector circuit 7. The peak-detected signal $S_p$ is shown in FIG. 2C in broken lines and has a magnitude $E_{pp}$. Part of this magnitude is made up of the pulses $P_d$, but the remainder of it is made up of the peak value of the synchronizing pulses in the composite video signal. The latter part changes in amplitude as the video signal $S_y$ changes, and this change produces a change in the value of the peak detected voltage $S_p$.

The operation of the circuit in FIG. 1 will be described in greater detail with reference to the graph in FIG. 3.

It will be noted that this graph indicates the peak detector output as a function of the video signal level. As has been noted, the magnitude $V_p$ of the delayed pulse signal $P_d$ is selected to be larger than the average magnitude of the luminance signal, or more specifically, the white peak level thereof. As a result, when the level of the luminance signal is below the magnitude $V_p$, the magnitude of the peak detected signal $S_p$ increases only in response to increments of the increase in the synchronizing signal amplitude. That is, the peak-to-peak value $E_{pp}$ of the detected output signal of the mixer circuit 6 will increase along the relatively gentle slope $l_1$ as shown in FIG. 3, for small values of the video signal level. By applying the output signal of the peak detector circuit 7 to the gain controlled amplifier 2, the gain of this amplifier will decrease gradually as the video signal level increases.

However, if the level of the luminance signal becomes larger than that of the pulse signal $P_d$, the peak-to-peak value $E_{pp}$ will be increased abruptly along the slope $l_2$, as shown in FIG. 3. This is due to the fact that the peak-to-peak value $E_{pp}$ is equal to the total magnitude of the synchronizing signal and the luminance signal, and when the latter exceeds the amplitude of the pulse signal $P_d$, both the positive and negative peak values of the composite video signal will be applied to the detector 7. This rapid increase in the amplitude of the output signal of the detector 7 causes the gain of the amplifier 2 to decrease much more rapidly, which assists in returning the amplitude of the composite video signal at the output terminal 3 to its proper value by controlling the gain of the amplifier 2 more rapidly if the amplitude of the composite video signal is high than if it is low.

In an A.G.C. circuit of the type shown in FIG. 1, there are two conventional ways to form the delayed pulse $P_d$ shown in FIG. 2B. One of these ways includes providing a differentiating circuit in the wave forming circuit 5 to differentiate the synchronizing pulse $P_h$. A comparison circuit is also provided in the wave forming circuit 5 to compare the differentiated trailing edge of the synchronizing pulse $P_h$ with a reference voltage of the proper polarity to generate a pulse signal only when the magnitude of the differentiated trailing edge signal derived from the pulse $P_h$ exceeds the reference level. The compared signal may then be supplied to a switching circuit in the wave forming circuit 5 to generate a suitable delayed pulse $P_d$ as shown in FIG. 2B.

However, a circuit that relies upon differentiation of the incoming synchronizing pulses $P_h$ inherently produces differentiated pulses from the leading edge of the synchronizing pulse signal $P_h$ as well as from the trailing edge, and these leading edge pulses are of the opposite polarity from the pulses actually used in forming the pulses $P_d$. The leading edge pulses may therefore influence the following video signal since such pulses are, in essence, noise signals. An even more serious defect of the circuit utilizing differentiation is that delayed pulses may be produced from noise signals that pass through the synchronizing signal separating circuit 4. The differentiating circuit cannot distinguish between signals that have rapid voltage excursions and thus cannot distinguish synchronizing signals from noise signals.

Another conventional way of obtaining delayed pulses is to apply the synchronizing signal $P_h$ to a delay circuit and then to invert the delayed output signal and combine it with the composite video signal. Such delay circuits include inductance and capacitance elements and thus are not suitable to be constructed as integrated circuits. In addition, the temperature characteristic of the inductance is generally not stable. As a result the delay time and the pulse width of the delayed pulse are likely to vary in response to the variation of temperature.

FIG. 4 shows an embodiment according to the present invention in which the same reference numerals as used in the circuit in FIG. 1 are used again to refer to circuit elements that are the same as those in FIG. 1. In FIG. 4 only the wave forming circuit 5 is constructed to be different from circuits as constructed heretofore.

The wave forming circuit 5 comprises an integrating circuit 51 and a switching circuit 52. The output of the synchronizing signal separating circuit 4 is connected to the integrating circuit 51, which consists of a resistor 53 and a capacitor 54. The output of the integrating circuit is connected to the input of the switching circuit, which is formed as a Schmitt trigger of the differential amplifier type.

The Schmitt trigger circuit includes a pair of differentially connected transistors 55 and 56 that have their emitters connected directly together to one terminal of a constant current source 57. The other terminal of the constant current source 57 is connected to a reference voltage, such as ground. A bias voltage is provided for the base of the transistor 55 by connecting a voltage divider comprising two resistors 58 and 59 connected in series between the power supply terminal at the voltage $+V_{cc}$ and ground. The common circuit point between the resistors 58 and 59 is connected to the base of the transistor 55, as is the output terminal of the integrator 51.

The collector of the transistor 55 is connected by a resistor 60 to the base of the transistor 56, and another resistor 61 is connected between the base of the transistor 56 and ground. A load resistor 62 is connected between the power supply terminal and the collector of the transistor 55. The collector of the transistor 56 is connected to the power supply terminal by way of another load resistor 63 and is also connected to the base an emitter-follower transistor 64. The transistor 64 has an emitter load resistor 65 connected to ground and the emitter output terminal of the transistor 64 is connected to one of the input terminals of the mixer circuit 6.

The operation of the circuit in FIG. 4 will be described with reference to the wave forms in FIG. 5. The output signal of the synchronizing signal separating circuit 4 is the pulse signal $P_h$ in FIG. 5A, here shown as a positive-going pulse. When this signal is applied to the integrating circuit 51, a typical integrated signal $S_i$ is obtained and is applied to the base of the transistor 55. Initially, the transistor 55 is nonconductive and the transistor 56 is therefore conductive. Current flowing through the load resistor 63 produces a voltage drop across that resistor. The base potential of the transistor 56 is maintained at a constant value $E_s$ determined by the voltage-dividing action of the resistors 60, 61, and 62.

As long as the amplitude of the integrated signal $S_i$ is smaller than the voltage $E_s$, the transistors 55 and 56 will remain in their respective nonconductive and conductive conditions. When the voltage across the integrating capacitor 54 finally reaches the value $E_s$, the states of conductivity of the transistors 55 and 56 will be reversed as the transistor 55 becomes conductive and suddenly reduces the voltage at its collector and therefore the voltage at the base of the transistor 56. When the transistor 56 becomes nonconductive, the voltage at its collector increases suddenly to the value of the supply voltage, which is $+V_{cc}$. The collector of the transistor 56 is connected to the base of the transistor 64, so that the collector voltage increment is directly transferred to the base of the transistor 64. Thus the emitter voltage of the transistor 64 follows the base voltage thereof and produces the leading edge of the pulse $P_d$ shown in FIG. 5C.

Later, when the voltage across the integrating capacitor 54 has decreased sufficiently following the end of the pulse $P_h$ in FIG. 5A, the value of the integrated signal $S_i$ drops below the turn-off voltage of the Schmitt trigger, which is approximately at the level $E_s$ or a little below that level, and causes the state of conductivity of the transistors 55 and 56 to reverse back to their original condition. This produces the trailing edge of the pulse $P_d$ as shown in FIG. 5C.

The pulse $P_d$ is supplied through the emitter-follower circuit to the mixer circuit 6 there to be combined with the composite video signal. The combined signal is applied to the peak detector circuit 7 and the output signal of that circuit controls the amplitude of the composite video signal $S_v$ by controlling the gain of the amplifier 2 in the same manner as in FIG. 1.

According to the present invention, the effect of integrating the synchronizing pulse signal $P_h$ instead of differentiating it is to make the delayed pulse generating circuit non-responsive to noise signals and to prevent it from generating differentiated signals that are the equivalent of noise signals. Even if noise signals reach the integrating circuit 51, they are by-passed to ground by the capacitor 54.

In addition, the circuit of this invention does not require the use of an inductance. As a result, the operation of the circuit is not affected by instability of the inductance due to the variations of temperature.

In the embodiment of FIG. 4 the synchronizing signal separating circuit 4 shown connected to the input side of the amplifier 2. However, as indicated by the dotted line, it may be connected to the output terminal of the amplifier 2 to benefit from the additional stability provided by gain control of the amplifier.

It will be noted that the pulse $P_d$ in FIG. 5C overlaps the pulse $P_h$ in FIG. 5A. Thus, it will not be entirely separated from the synchronizing pulse $P_h$ so as to appear to be entirely on the back porch of the blanking pulse in the manner illustrated in FIG. 2C. However, this not detrimental to the operation of the circuit since all that is measured by the peak detector circuit 7 is the peak-to-peak value of the combined composite video signal and the signal $P_d$. It is not necessary to preserve the wave form of the synchronizing signal portion of the combined signal.

Although this invention has been described in terms of a specific embodiment, it will be understood by those skilled in the art that modifications may be made therein within the true scope of the invention as defined by the following claims.

What is claimed is:

1. An automatic gain control circuit for a video signal, said circuit comprising:
   A. a gain-controlled amplifier;
   B. signal forming means comprising:
      1. a circuit for integrating the synchronizing signal portion of the video signal, and
      2. a circuit to compare the integrated signal with a reference signal and to generate a pulse signal within the horizontal blanking interval of the video signal;
   C. means for combining the pulse signal with the video signal in opposite polarity relative to the synchronizing signal portion of the video signal; and
   D. a control circuit connected to said last-named means for deriving therefrom a control signal having a magnitude that is a function of at least the synchronizing signal portion of the video signal, said control circuit being connected to said amplifier to control the gain thereof.

2. An automatic gain control circuit according to claim 1 in which said control circuit comprises a peak detector circuit for detecting the peak value of the combined signal.

3. An automatic gain control circuit according to claim 1 comprising means to set the magnitude of the pulse signal to a value larger than the average white peak level of the luminance portion of the video signal.

4. An automatic gain control circuit according to claim 1 in which the comparing circuit comprises a Schmitt trigger circuit.

5. An automatic gain control circuit according to claim 1 comprising, in addition, a synchronizing signal separating circuit for separating the synchronizing signal portion of the video signal, said synchronizing signal separating circuit being connected to said integrating circuit to supply the separated synchronizing signal thereto.

6. An automatic gain control circuit according to claim 5 in which the synchronizing signal separating circuit is connected to the input of said gain controlled amplifier to be energized thereby.

7. An automatic gain control circuit according to claim 5 in which the synchronizing signal separating circuit is connected to the output of said gain controlled amplifier to be energized thereby.

* * * * *